United States Patent

Knoll et al.

[11] Patent Number: 5,163,105
[45] Date of Patent: Nov. 10, 1992

[54] COUPLING COMPONENT FOR A LIGHT-WAVEGUIDE

[75] Inventors: Peter Knoll, Ettlingen; Winfried Koenig, Pfinztal-Berghausen; Clemens Guenther, Sexau, all of Fed. Rep. of Germany

[73] Assignee: Robert Bosch GmbH, Stuttgart, Fed. Rep. of Germany

[21] Appl. No.: 775,934

[22] PCT Filed: Mar. 26, 1990

[86] PCT No.: PCT/DE90/00243
§ 371 Date: Oct. 25, 1991
§ 102(e) Date: Oct. 25, 1991

[87] PCT Pub. No.: WO90/13835
PCT Pub. Date: Nov. 15, 1990

[30] Foreign Application Priority Data

May 3, 1989 [DE] Fed. Rep. of Germany ....... 3914590

[51] Int. Cl.⁵ .............................. G02B 6/26; H01J 5/16
[52] U.S. Cl. ...................................... 385/44; 385/31; 385/48; 385/89; 250/227.11
[58] Field of Search ............... 385/31, 44, 47, 48, 385/88, 89, 92; 250/227.11

[56] References Cited

U.S. PATENT DOCUMENTS

| | | | |
|---|---|---|---|
| 4,103,154 | 7/1978 | d'Auria et al. | 385/48 |
| 4,173,390 | 11/1979 | Kach | 385/44 |
| 4,346,961 | 8/1982 | Porter | 385/44 X |
| 4,447,118 | 5/1984 | Mulkey | 385/47 |
| 4,516,828 | 5/1985 | Steele | 385/31 |
| 4,765,706 | 8/1988 | Marcatili et al. | 385/44 |
| 4,826,274 | 5/1989 | Diamantstein et al. | 385/31 |
| 4,863,229 | 9/1989 | Yasui | 385/31 |

FOREIGN PATENT DOCUMENTS

| | | | |
|---|---|---|---|
| 2614051 | 5/1987 | Fed. Rep. of Germany | 385/44 X |
| 2140576 | 11/1984 | United Kingdom | 385/31 X |

Primary Examiner—Brian Healy
Attorney, Agent, or Firm—Michael J. Striker

[57] ABSTRACT

A light-waveguide device has a light waveguide having a circumference provided with a groove, and a coupling element having a carrier and at least one of a light-sensitive transmitting component and a light-sensitive receiving component for coupling an optical radiation in and out of the light waveguide. The carrier is T-shaped and has a base surface and a central support. The at least one light-sensitive component is arranged on the T-shaped carrier and forms with the base surface of the T-shaped carrier an angle $\alpha$. The central support of the T-shaped carrier is inserted in the groove so that the at least one light-sensitive element is inserted with its surface at least partially in the groove so that from the groove a portion of the optical radiation of the light waveguide falls on or exits from the at least one light-sensitive component and the portion of the optical radiation can be tapped as an electrical signal at the light-sensitive transmitting component or an additional portion of the optical radiation can be fed to the transmitting component.

9 Claims, 2 Drawing Sheets

COUPLING COMPONENT FOR A LIGHT-WAVEGUIDE

BACKGROUND OF THE INVENTION

The present invention relates to a coupling component for a light waveguide. More particularly it relates to a coupling component for a light waveguide which has a groove arranged at the circumference and a light-sensitive transmitting and/or receiving component for coupling the optical radiation in and out of the light waveguide. A coupler for a light waveguide is already known from DE-PS 26 14 051, in which a notch or groove is partially arranged at the circumference of the light waveguide. The side flanks of the groove have smooth surfaces which are reflective. A transmitting or receiving device is arranged on the side of the light waveguide opposite the groove. The radiation in the light waveguide is partially directed at the reflective surfaces of the groove to the receiver. The radiation generated by the transmitter is coupled into the light waveguide via the reflective surface in a corresponding manner. This arrangement of a coupling component requires great precision in the production of the coupling component. The cost is also considerable, since the flanks of the groove must be very smooth, flat and reflective. The coupling of the receiving and transmitting component also requires high precision, since a portion of the coupled out optical radiation is otherwise lost in the boundary layer between the light waveguide and the connected component. Since the fibers of the light waveguide are relatively thin, the coupled receiving and transmitting component can only be mechanically loaded to a very small degree. Therefore, shaking can easily lead to breakage and accordingly to a failure of the coupling component.

SUMMARY OF THE INVENTION

In keeping with these objects and with others which will become apparent hereinafter, one feature of the present invention resides, briefly stated, in a coupling component of the above mentioned general type in which at least one light-sensitive receiving component and/or transmitting component is arranged in the area of the groove, a portion of the optical radiation of the light waveguide exists or enters from the groove, and the portion of the optical radiation can be tapped as electrical signal at the receiving component and an additional portion of the optical radiation can be fed to the transmitting component.

When the coupling component is designed in accordance with the present invention it the characterizing features of the main claim has the advantage over the prior art that the light-sensitive receiving and transmitting component is not arranged on the side located opposite the groove, but rather in the area of the groove. Accordingly, the coupling component is very simple to produce, since the groove can be produced without special tools and a metallization of the surfaces can be dispensed with. It is also particularly advantageous that the receiving and transmitting component comprises electrical connections by means of which the optical radiation can be tapped as an electrical signal and a signal can be coupled into the light waveguide. The handling of the coupling component is accordingly very simple and reliable.

It is particularly advantageous that the inserted groove has the shape of a cylinder segment or a wedge shape. Such grooves can be produced without special tools, e.g. with a knife. Special precision in production, particularly taking into account a determined angle, is not necessary.

Further, it is possible to adjust the coupling factor of the coupling component by means of varying the depth of the groove. With very deep grooves, the receiving and transmitting component can penetrate deeper into the light waveguide, so that the active surface of this component is enlarged. If the components are less deeply inserted into the light waveguide, the coupling factor is correspondingly lower. In this way, the coupling factor can be adjusted with simple means.

The efficiency of the coupling component can be optimized in an advantageous manner by means of changing the angle of inclination of the receiving and transmitting component for the propagation direction of the optical radiation. Thus, the greatest efficiency is achieved when the surface normal of the component lies approximately parallel to the propagation direction of the optical radiation in the light waveguide.

Another advantage consists in that the coupling component is sealed with a transparent sealant which has approximately the same optical refraction coefficient as the light waveguide. Disturbing reflections at the cut surfaces of the groove are accordingly prevented.

It is also advantageous if the receiving component is a photodiode or the transmitting component is an IR radiator. These components are commercially available and inexpensive to obtain.

It is also particularly advantageous that the receiving and transmitting component is connected, via electrical lines, with connection pins which are arranged in a carrier plate. The equivalent electrical signal can accordingly be coupled in or out in a simple manner.

In order to conduct off occurring heat loss it is advantageous to fasten the components to the carrier on their passive sides by means of a heat conducting glue. The disturbing heat losses can accordingly be conducted off without the occurrence of excessive mechanical stresses or displacements of the components as a result of increases in temperature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
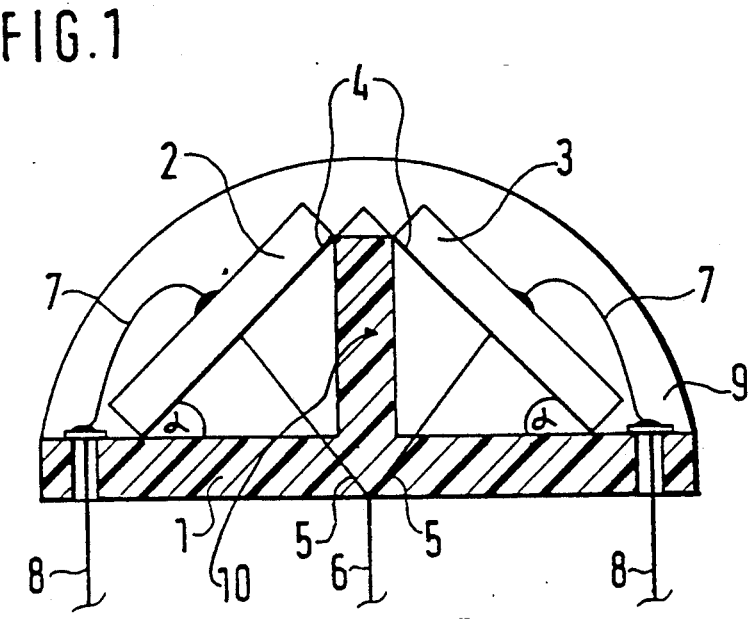
FIG. 1 shows an arrangement of the receiving and transmitting component.
Figure 2:
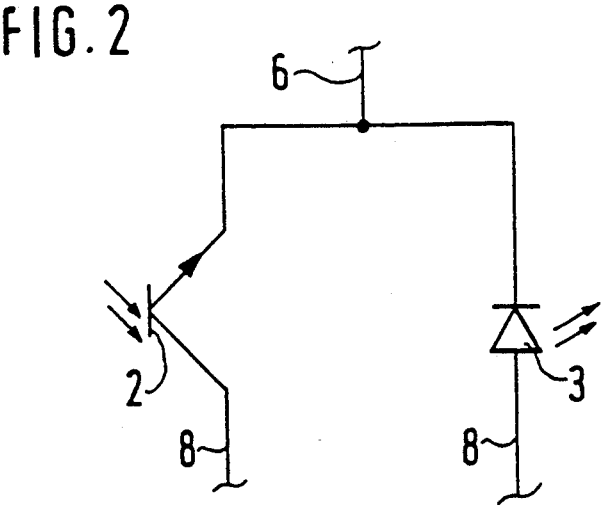
FIG. 2 shows an electrical wiring diagram.

According to FIG. 1, a coupling component 10 in accordance with the present invention has a carrier 1 arranged at the center of its surface area. The carrier 1 is composed of a plastic or ceramic or another suitable material. A receiving component 2, which is constructed as a photodiode or a phototransistor, or a transmitting component 3, which is constructed as a luminescent diode, is placed on the center support in such a way that it forms an angle α with the surface of the carrier 1. It has been shown that the attenuation in the waveguide is low when the angle α is approximately 45°–60°. It must be taken into account that the coupling component would penetrate deeply into the light waveguide at a large angle α. The receiving and transmitting component 2, 3 is fastened at the carrier 1 with a conductive glue. Conductive glues are known in semiconductor technology and serve particularly for improving the conducting off of heat into the surroundings. The components 2, 3 are connected with connection pins 6, 8 via electrical lines. An electrical signal can be tapped or fed via these connection pins 6, 8. The conductors connected to the back of the component 2, 3 are connected to a ground line at the connection pin 6, so that a component between a connection pin 8 and a connection pin 6 can be controlled. The coupling component 10 is now inserted in a groove of the light waveguide 41 provided as a notch which is arranged at the circumference of the light waveguide transversely relative to its longitudinal direction. The groove need not have an exact fit, since the intermediate spaces between the components 2, 3 and the light waveguide 41 are sealed with a transparent sealant 9. It is advisable that the refraction coefficient of the sealant 9 conform to that of the light waveguide 41, so that no unnecessary reflections can occur and the losses are accordingly low. The coupling component can penetrate to a greater or lesser depth into the groove of the light waveguide, as desired. Further, it can be tilted within certain limits, so that it can easily be adapted to the wave propagation in the light waveguide 41. The coupling component can be installed at a desired location. No special requirements are set for the light waveguide. FIG. 2 shows an electrical wiring diagram of the coupling component 41. A phototransistor 2, as receiving component, and a luminescent diode 3, as transmitting component, are shown between the connection pins 8 and 6. The emitter of the phototransistor 2 and the cathode of the luminescent diode 3 are joined and connected with the connection pin 6.

The operation of this coupling component is described in the following.

Figure 3:
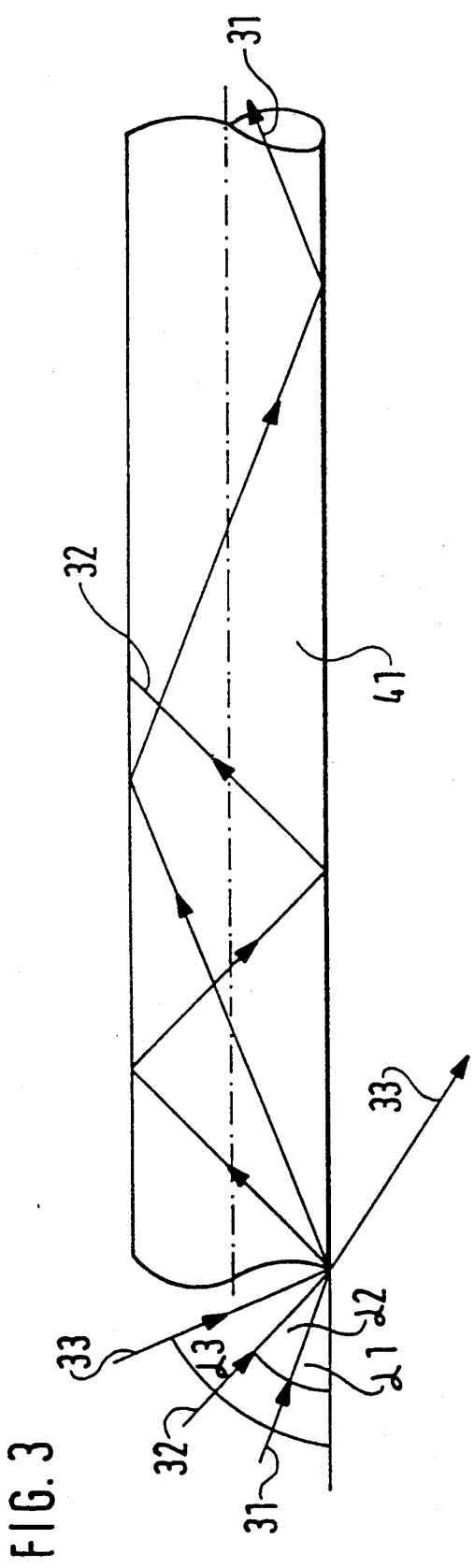
FIG. 3 shows a light waveguide.
Figure 4:
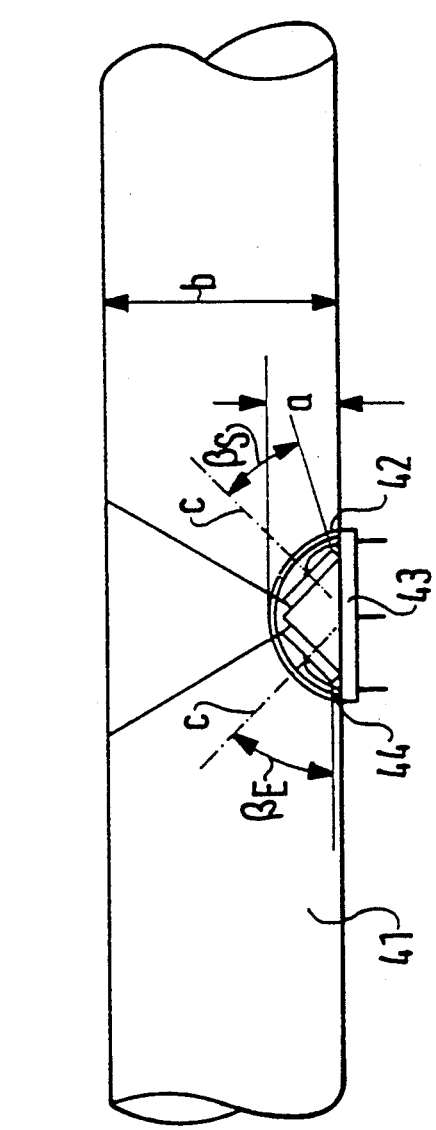
FIG. 4 shows an arrangement of a coupling component at a light waveguide.

As can be seen from FIG. 3, only those beams whose angle of incidence is less than the limiting angle for total reflection are, in principle, capable of propagation in a light waveguide. This angle is approximately 33° and 45° for plastic waveguides with a high refraction coefficient n. The angles of incidence α1 and α2 in beams 1 and 2 are so small that the beams remain in the fiber and are propagated. The beam α3, on the other hand, exits from the fiber, since its angle 3 is greater than the critical angle. Since coupling components with high efficiency are desired, the surface normal c of the receiving and transmitting component must conform as much as possible to the propagation direction. The components 2, 3 are therefore inserted in the light waveguide 41 corresponding to FIG. 4 in such a way that their surface normals lie approximately parallel to the propagating direction of the radiation, i.e. the angle $\beta_E$ or the angle $\beta_S$ corresponding to the angle α. In order to avoid an excessive penetration into the light waveguide 41 on the one hand and to keep the attenuation low on the other hand, the angle α was advantageously fixed at 45°. A portion of the radiation propagating in the light waveguide 41 now falls on the receiving component 2 which provides an electrical signal at its output terminals 8, 6 corresponding to the modes. This electrical signal can be measured with an electrical measuring device, not shown. This measuring device is known to the person skilled in the art and is therefore not the subject matter of the invention. As a result of this arrangement of the receiving component 2, only beams whose propagation direction is in the direction of the coupling component can be coupled out. No beams can be received from the opposite direction, since they practically do not occur on the active surface of the receiving component 2. A simple directional effect of the radiation is achieved in this manner.

In a corresponding manner, an electrical signal, which is propagated as optical radiation in the light waveguide 41, can be fed into the transmitting component 3. Also, in this case, the propagation direction is determined by means of the positioning of the transmitting component 3. A luminescent diode, for example, which is known e.g. as a light-emitting diode, can be used as a transmitting component. However, other optoelectronics converters can also be used. The coupling of the coupling component 10 can be carried out at the light waveguide as desired. The light waveguide 41 need not be cut apart as is required in other commercially available coupling components. Since the groove depth a is relatively small in comparison to the diameter b of the light waveguide 41, the attenuation of the radiation in the light waveguide 41 is also low.

It will be understood that each of the elements described above, or two or more together, may also find a useful application in other types of constructions differing from the types described above.

While the invention has been illustrated and described as embodied in a coupling component for a light-waveguide, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A light-waveguide device, comprising a light waveguide having a circumference provided with a groove; and a coupling element having a carrier and at least one of a light-sensitive transmitting component and a light-sensitive receiving component for coupling an optical radiation in and out of said light waveguide, said carrier being T-shaped and having a base surface and a central support, said at least one light-sensitive component being arranged on said T-shaped carrier and forms with said base surface of said T-shaped carrier an angle α, said central support of said T-shaped carrier being inserted in said groove so that said at least one light-sensitive element is inserted with its surface at least partially in said groove so that from said groove a portion of said optical radiation of said light waveguide falls on or exits from said at least one light-sensitive component and the portion of the optical radiation can be tapped as an electrical signal at said light-sensitive transmitting component or an additional portion of the optical radiation can be fed to the transmitting component.

2. The light waveguide device as defined in claim 1, wherein said groove has the shape of a cylinder segment.

3. The light waveguide device as defined in claim 1, wherein said groove has a wedge shape.

4. The light waveguide device as defined in claim 1, wherein a surface normal of said at least one light-sensitive component approximately coincides with a propagation direction of the optical radiation in said waveguide.

5. The light waveguide device as defined in claim 1, and further comprising a transparent sealant which has approximately same optical refraction coefficient as a refraction coefficient of said light waveguide, said coupling component being fastened with said transparent sealant.

6. The light waveguide device as defined in claim 1, wherein said light-sensitive component is said receiving component formed as a photodiode.

7. The light waveguide device as defined in claim 1, wherein said at least one light-sensitive component is said transmitting component formed as an IR radiator.

8. The light waveguide device as defined in claim 1, comprising both said receiving component and said transmitting component each having a first connection and a second connection; and further comprising connection pins arranged on said carrier, electrical conductors, and a joint connection pin, each of said light sensitive receiving component and transmitting component being connected by their first connection through said electrical conductor with said connection pins arranged on said carrier, while said second connection of each of said receiving and transmitting components is guided on said joint connection pin.

9. The light waveguide device as defined in claim 1, comprising both said receiving component and said transmitting component; and further comprising means for fastening said components on said carrier and including a heat conducting glue.

* * * * *